United States Patent [19]

Reade

[11] 4,224,074

[45] Sep. 23, 1980

[54] NON-TOXIC FRITS FOR DECORATING GLASS, GLASS-CERAMIC AND CERAMIC ARTICLES

[75] Inventor: Richard F. Reade, Corning, N.Y.

[73] Assignee: Corning Glass Works, Corning, N.Y.

[21] Appl. No.: 80,496

[22] Filed: Oct. 1, 1979

[51] Int. Cl.$^2$ .......................... C03C 7/00; C03C 3/14
[52] U.S. Cl. ........................................ 106/48; 106/54
[58] Field of Search ..................................... 106/48, 54

[56] References Cited

U.S. PATENT DOCUMENTS

| | | | |
|---|---|---|---|
| 2,294,931 | 9/1944 | Paquet | 106/48 |
| 2,347,187 | 9/1944 | Frost | 106/48 |
| 3,673,049 | 6/1972 | Giffen et al. | 106/48 |
| 3,891,452 | 6/1975 | Low | 106/48 |

FOREIGN PATENT DOCUMENTS 338501  6/1972  U.S.S.R. .................................. 106/48

*Primary Examiner*—Helen M. McCarthy

*Attorney, Agent, or Firm*—Clinton S. Janes, Jr.

[57] ABSTRACT

This invention is directed to the production of frits useful in decorating glazes and enamels for glass, glass-ceramic, and ceramic food service ware which exhibit coefficients of thermal expansion (20°–300° C.) between about $50$–$110 \times 10^{-7}$/°C., a viscosity suitable for firing at about 650°–775° C., good glass stability, high gloss, and excellent resistance to attack by acids and bases, especially detergents such as are used in commercial dishwashers. The frits consist essentially, expressed in weight percent on the oxide basis as calculated from the batch, of:

$SiO_2$:29–55
$B_2O_3$:7–31
$Al_2O_3$:2–8
$ZrO_2$:5–16
$Na_2O$:4–20
$Li_2O$:0–7
$Na_2O+Li_2O$:6–24
F:0.75–4.

2 Claims, No Drawings

NON-TOXIC FRITS FOR DECORATING GLASS, GLASS-CERAMIC AND CERAMIC ARTICLES

BACKGROUND OF THE INVENTION

Glasses, ceramics, and, more recently, glass-ceramics have been utilized extensively in both culinary and tableware applications. In some instances, the base materials have been used in the plain state for such applications, i.e., with no external decoration. Most consumers, however, desire a decorative appearance or finish on such articles so much research effort has been undertaken to develop glazes and enamels to satisfy that desire. Practically speaking, glazes are clear glasses and enamels are glazes to which pigments are added to provide color thereto. Both are applied to the surface of the ware to be coated in very finely-divided form ("frit") and then fired to form a strongly-adherent, continuous film on the ware.

The vast majority of the commercially-available frits for decorating glass, glass-ceramic, and ceramic ware has contained significant quantities of lead oxide and, in certain products, cadmium oxide. Those compounds serve to reduce the melting point of the frit and raise the index of refraction thereof. Unfortunately, cadmium and lead are extremely toxic metals such that glazes and enamels containing those metals must demonstrate exceptional resistance to attack by such varied chemicals as acids and alkalies in order to preclude substantial release thereof. Because of the recognized potential danger from release of those metals when ware is used in contact with food, the Food and Drug Administration (FDA) has established, in its *Compliance Guidance Manual*, issued June 13, 1974, maximum limits of lead and cadmium metal release which a food-contacting surface must not exceed.

It is, of course, self-evident that the hazard of cadmium and/or lead toxicity could be eliminated by providing frits totally devoid of those metals. However, several problems have faced the frit manufacturer when seeking to produce such frits.

First, the firing temperature of the frit, i.e., the temperature required to soften the frit sufficiently to develop a smooth homogeneous coating, must be low enough so as to avoid thermal deformation of the ware being coated.

Second, the coefficient of thermal expansion of the frit must reside in the vicinity of that of the ware to inhibit the onset of crazing and/or spalling. Ideally, the frit will exhibit a coefficient of thermal expansion slightly below that of the substrate ware such that the decorating coating will be placed in compression with respect to the substrate after being fired thereon.

Third, the durability of the frit must be adequate to resist attack by acids and bases, especially attack by detergents, leading to loss of gloss, development of haze or iridescence, production of porosity, or other phenomena detrimental to the aesthetic appearance of the glaze or enamel.

Fourth, the index of refraction of the frit must be sufficiently high to impart a clear high gloss.

Fifth, the frit must demonstrate good stability, i.e, the frit must not be subject to devitrification during the firing step.

OBJECTIVES OF THE INVENTION

The primary objective of the instant invention is to provide frits suitable as base materials for decorative glazes and enamels which are particularly useful with food service ware because the toxic metals cadmium and lead are absent therefrom.

A further objective of the instant invention is to provide such frits which exhibit a high index of refraction, good stability, coefficients of thermal expansion (20°-300° C.) ranging between about $50-110 \times 10^{-7}/°C.$, firing temperatures over the interval of about 650°-775° C., and excellent resistance to attack by acids and alkalies, particularly attack by detergents.

SUMMARY OF THE INVENTION

I have discovered that frits satisfying those objectives can be prepared from glasses within the $R_2O$—$Al_2O_3$—$ZrO_2$—$B_2O_3$—$SiO_2$—F composition system wherein $R_2O$ consists of $Na_2O$ with, optionally but desirably, $Li_2O$. In powdered frit form, the compositions are useful as base materials for decorative glazes and enamels. Because of the absence of potentially toxic heavy metals such as cadmium and lead, the compositions are eminently suitable for decorating food service ware. The operable composition ranges recited below, expressed in weight percent on the oxide basis, exhibit coefficients of thermal expansion (20°-300° C.) between about $50-110 \times 10^{-7}/°C.$, viscosities suitable for firing at temperatures within the 650°-775° C. interval, and excellent resistance to attack by acids and alkalies, particularly attack by detergents such as are used in a commercial dishwasher. Since it is not known with which cation(s) the fluoride ion is combined, it is simply reported as fluoride, in accordance with conventional glass analysis practice.

$SiO_2$: 29-55
$B_2O_3$: 7-31
$Al_2O_3$: 2-8
$ZrO_2$: 5-16
$Na_2O$: 4-20
$Li_2O$: 0-7
$Na_2O + Li_2O$: 6-24
F: 0.75-4

The inclusion of substantial amounts of $ZrO_2$ is vital to achieve a high index of refraction plus the desired exceptional chemical durability. Such large quantities of $ZrO_2$, however, significantly increase the coefficient of thermal expansion and the viscosity of the frits, extensive adjustments in the remaining components are demanded to attain the desired combination of stability, coefficient of thermal expansion, viscosity, and chemical durability, and this factor is especially critical where coefficients of thermal expansion less than $80 \times 10^{-7}/°C.$ are sought.

In general, the constituents of the inventive frits will be limited to those recited above. However, minor amounts of compatible metal oxides may be tolerated to modify the physical properties or the melting behavior of the frits, the sum of all such additions not exceeding about 5%. Hence, for example, $K_2O$ may replace part of the $Na_2O$ and $TiO_2$ and/or $HfO_2$ may be added to raise the refractive index. And, of course, where an enamel is desired, pigments may be dissolved and/or suspended therein. Customarily, the quantity of pigment incorporated will be less than 20% by weight and, commonly, less than 10%.

The most preferred compositions will exhibit coefficients of thermal expansion (20°-300° C.) of no more than about $80 \times 10^{-7}/°C.$ A range of compositions has been found which will exhibit coefficients of thermal expansion between about $50-80\times10^{-7}/°C$. and which can be fired at temperatures between about 675°-775° C. Such expansion coefficients render the frits (and the resulting glazes and enamels) very compatible with a large proportion of commercially-marketed glass, glass-ceramic, and ceramic food service ware. In many instances the decorating coating will be in compression with respect to the ware, thereby imparting enhanced mechanical strength to the ware. The firing temperatures are sufficiently low as to avoid thermal deformation of the ware being decorated. Such preferred compositions, demonstrating excellent chemical durability, gloss, and glass stability, consist essentially of:

$SiO_2$: 40-55%
$B_2O_3$: 16-31
$Al_2O_3$: 5-8
$ZrO_2$: 5-14
$Na_2O$: 4-10
$Li_2O$: 0-7
$Na_2O+Li_2O$: 6-13
F: 0.75-4

DESCRIPTION OF THE PREFERRED EMBODIMENTS

Table I records a number of frit compositions, expressed in parts by weight on the oxide basis as calculated from the batch, illustrating the present invention. In accordance with the explanation above, the fluoride content is reported simply as F. Inasmuch as the sum of the various components equals or closely approximates 100, for all practical purposes the individual constituents may be deemed to be present in weight percent. The actual batch ingredients utilized may be any materials, either the oxide or other compounds, which, when melted in combination, will be converted to the desired oxide in the proper proportions.

Batches for the recited examples were compounded in the indicated proportions and ballmilled to aid in achieving a homogeneous melt. Each batch was deposited into a platinum crucible, the crucible covered with a platinum lid to inhibit volatilization, and then introduced into a furnace operating at 1450° C. After melting for about two-three hours, part of the molten batch was formed into plates having dimensions of about $4''\times4''\times0.25''$ and those plates immediately transferred to an annealer operating at 300°-400° C. The remainder of the molten batch was poured into a bath of water to produce finely-divided glass particles which, after drying, were ground to pass a 100 U.S. Standard Sieve (149 microns), a 200 U.S. Standard Sieve (74 microns), or a 325 U.S. Standard Sieve (44 microns). Table I also reports the softening point (S.P.), annealing point (A.P.), strain point (St. P.), each recorded in °C., and coefficient of thermal expansion over the range 20°-300° C. (Exp.), reported in terms of $\times10^{-7}/°C$., as determined from the above-described annealed plates. Each of the above determinations was made utilizing measuring methods conventional in the glass art.

TABLE I

| | 1 | 2 | 3 | 4 | 5 | 6 | 7 | 8 |
|---|---|---|---|---|---|---|---|---|
| $SiO_2$ | 49.0 | 47.7 | 46.4 | 43.5 | 50.1 | 49.3 | 52.0 | 49.3 |
| $B_2O_3$ | 30.9 | 30.1 | 29.3 | 28.8 | 23.2 | 26.6 | 18.9 | 22.5 |
| $Al_2O_3$ | 7.6 | 7.4 | 7.2 | 5.3 | 5.3 | 7.2 | 5.5 | 6.9 |
| $ZrO_2$ | 5.5 | 8.0 | 10.4 | 12.8 | 12.8 | 7.0 | 13.3 | 6.7 |
| $Na_2O$ | 6.0 | 5.8 | 5.7 | 9.6 | 5.8 | 8.7 | 4.2 | 8.3 |
| $Li_2O$ | 1.1 | 1.1 | 1.0 | — | 2.8 | 1.3 | 6.1 | 2.4 |
| $TiO_2$ | — | — | — | — | — | — | — | 1.1 |
| $HFO_2$ | — | — | — | — | — | — | — | 2.8 |
| F | 0.8 | 0.8 | 0.8 | 2.4 | 1.2 | 3.2 | 2.5 | 3.1 |
| S.P. | 617 | 611 | 612 | 610 | 634 | 598 | 617 | |
| A.P. | 446 | 440 | 436 | 470 | 490 | 429 | 478 | |
| St.P. | 4.4 | 404 | 399 | 444 | 457 | 398 | 451 | |
| Exp. | 50.3 | 55.1 | 58.6 | 56.3 | 60.6 | 64.6 | 66.3 | 68.3 |

| | 9 | 10 | 11 | 12 | 13 | 14 | 15 | 16 |
|---|---|---|---|---|---|---|---|---|
| $SiO_2$ | 51.9 | 51.4 | 50.6 | 50.9 | 48.3 | 50.0 | 40.4 | 54.3 |
| $B_2O_3$ | 20.1 | 23.4 | 19.2 | 18.4 | 23.7 | 22.8 | 27.3 | 16.9 |
| $Al_2O_3$ | 7.0 | 7.1 | 6.7 | 5.4 | 7.0 | 7.0 | 5.7 | 6.9 |
| $ZrO_2$ | 10.1 | 6.9 | 9.7 | 13.1 | 10.1 | 6.7 | 13.8 | 10.0 |
| $Na_2O$ | 6.0 | 8.6 | 8.1 | 8.2 | 8.4 | 8.4 | 8.7 | 5.9 |
| $Li_2O$ | 4.9 | 2.5 | 3.5 | 4.0 | 2.4 | 1.2 | 4.2 | 6.1 |
| $TiO_2$ | — | — | 2.1 | — | — | — | — | — |
| F | 1.6 | 3.2 | 3.0 | 2.4 | 3.1 | 3.9 | 2.6 | 3.1 |
| S.P. | 612 | 600 | 604 | 620 | 592 | 600 | 583 | |
| A.P. | 471 | 445 | 458 | 473 | 439 | 435 | 457 | |
| St.P. | 440 | 413 | 429 | 442 | 409 | 401 | 429 | |
| Exp. | 70.0 | 70.2 | 72.5 | 76.6 | 74.7 | 76.4 | 80.2 | 77.2 |

| | 17 | 18 | 19 | 20 | 21 | 22 | 23 | 24 |
|---|---|---|---|---|---|---|---|---|
| $SiO_2$ | 45.8 | 46.4 | 46.1 | 41.0 | 51.1 | 44.7 | 52.3 | 40.9 |
| $B_2O_3$ | 22.7 | 19.2 | 21.0 | 23.8 | 14.8 | 23.6 | 11.4 | 23.7 |
| $Al_2O_3$ | 5.6 | 5.6 | 5.6 | 5.6 | 5.4 | 2.3 | 5.5 | 5.8 |
| $ZrO_2$ | 13.4 | 13.6 | 13.5 | 14.0 | 13.1 | 13.9 | 13.4 | 14.0 |
| $Na_2O$ | 8.4 | 10.3 | 9.3 | 10.6 | 11.9 | 10.5 | 11.8 | 10.6 |
| $Li_2O$ | 4.1 | 4.9 | 4.5 | 5.1 | 3.8 | 5.1 | 5.7 | 5.1 |
| F | 2.5 | 2.5 | 2.5 | 2.4 | 1.2 | 2.6 | 2.5 | 2.6 |
| S.P. | 596 | 594 | 594 | 581 | 628 | 590 | 601 | 577 |
| A.P. | 455 | 465 | 462 | 462 | 492 | 467 | 468 | 459 |
| St.P. | 425 | 439 | 434 | 435 | 462 | 438 | 440 | 431 |
| Exp. | 79.3 | 83.4 | 82.1 | 88.3 | 87.8 | 85.0 | 93.7 | 87.8 |

TABLE I-continued

|  | 25 | 26 | 27 | 28 | 29 | 30 | 31 | 32 |
|---|---|---|---|---|---|---|---|---|
| $SiO_2$ | 35.3 | 52.2 | 51.1 | 29.4 | 50.1 | 51.0 | 51.5 | 52.6 |
| $B_2O_3$ | 26.6 | 7.6 | 7.4 | 29.8 | 21.6 | 22.0 | 19.2 | 19.7 |
| $Al_2O_3$ | 6.0 | 5.6 | 5.4 | 6.2 | 6.6 | 6.7 | 6.8 | 6.9 |
| $ZrO_2$ | 14.5 | 13.5 | 13.1 | 15.1 | 10.3 | 10.4 | 10.5 | 10.8 |
| $Na_2O$ | 11.9 | 16.2 | 20.0 | 13.2 | 9.7 | 6.6 | 8.0 | 4.1 |
| $Li_2O$ | 5.7 | 5.2 | 3.2 | 6.4 | 1.6 | 3.2 | 3.8 | 5.9 |
| F | 2.7 | 1.2 | 1.2 | 2.8 | 2.4 | 2.4 | 2.4 | 2.5 |
| S.P. | 560 | 649 | 616 | 537 | 629 | 618 | 609 | 607 |
| A.P. | 448 | 468 | 475 | 437 | 460 | 457 | 463 | 466 |
| St.P. | 422 | 440 | 446 | 415 | 426 | 426 | 433 | 438 |
| Exp. | 94.9 | 105.2 | 107.8 | 103.6 | 70.1 | 62.2 | 71.5 | 65.4 |

|  | 33 | 34 | 35 |
|---|---|---|---|
| $SiO_2$ | 53.7 | 47.7 | 49.3 |
| $B_2O_3$ | 20.6 | 29.5 | 26.6 |
| $Al_2O_3$ | 7.4 | 7.2 | 7.1 |
| $ZrO_2$ | 10.0 | 7.0 | 6.9 |
| $Na_2O$ | 3.1 | 8.7 | 8.8 |
| $Li_2O$ | 5.1 | — | 1.2 |
| F | 1.6 | 3.1 | 3.2 |
| S.P. | 623 | 624 | 598 |
| A.P. | 474 | 430 | 429 |
| St.P. | 443 | 399 | 398 |
| Exp. | 58.0 | 67 | 63 |

As was noted above, the finely-divided glass particles resulting from pouring the molten batch into water were ground into powders of various sizes. The powders were pressed into cylindrical shapes having a height of about 0.5" and a diameter of about 0.5". The cylinders were placed on clean, smooth platinum foil having a thickness of about 0.025". The platinum foil was then introduced into an electrically-fired furnace, heated at 600° C./hour to a predetermined temperature, held thereat for 15 minutes, and then allowed to cool to room temperature while retained within the furnace (cooling at furnace rate).

This heat treatment causes the frit to fuse and flow into the shape of a button, the diameter of which is a useful measure of viscous flow. Hence, laboratory experience has indicated that a button diameter of at least 1.4 cm (~9/16") is adequate to insure good flow of the fused frit and wetting of an appropriate substrate for decorative purposes. (It will be appreciated, of course, that any proposed frit-substrate combination would be examined individually to make certain that the fired frit provided good coverage of the substrate surface with no pinholes, crazing, or spalling.) The flow buttons were peeled from the platinum foil, weighed accurately, and then subjected to tests for chemical attack.

Certain samples were immersed into an aqueous solution containing 5% by weight NaOH. Those immersions were carried out for 16 hours and 92 hours in a stirred solution at a temperature of 25° C. A weight loss of no more than about 0.1% is deemed to represent good resistance to alkali attack. Most of the buttons were subjected to another test which has been devised to test the durability of the glasses against alkaline detergents such as are used in commercial dishwashers. In this test, weighed samples of the glass are immersed into a 0.3% by weight aqueous solution of an alkaline detergent marketed by Economics Laboratories, St. Paul, Minn., under the mark Super Soilax. The solution is maintained for 96 hours at 95° C., following which the samples are removed from the solution, rinsed in tap water, dried, examined visually, and re-weighed to determine any weight loss. The immersion period of 96 hours is deemed an accelerated equivalent to the estimated exposure of food service ware during its expected lifetime. A weight loss of no more than 0.05% is considered to indicate excellent detergent resistance.

Porosity resulting in the surface of the buttons caused by the detergent attack was qualitatively adjudged utilizing the following test. The surface of a button previously exposed to the above-described detergent test was sprayed with SPOTCHECK® dye penetrant, marketed by Magnaflux Corporation, Chicago, Ill., and the dye permitted to remain thereon for 20 seconds. The dye was then dried and wiped clean first with wet (water) and then dry cloths. Visual inspection determined any residual strain.

Table II records the mesh size of the frit, the firing temperature employed (°C.), the diameter of the fused button (cm), the % weight loss after 16 hours and 92 hours in the NaOH solution, and the % weight loss after 96 hours in the Super Soilax solutions.

TABLE II

| Example No. | Mesh Size | Firing Temp. | Button Diameter | Button Appearance | % Weight Loss NaOH 16 hours | % Weight Loss NaOH 92 hours | % Weight Loss Super Soilax |
|---|---|---|---|---|---|---|---|
| 1 | 200 | 725° | 1.60 | Light Gray | — | — | <0.01 |
| 2 | " | " | 1.49 | Light Gray | — | — | <0.01 |
| 3 | " | " | 1.41 | Light Gray | — | — | 0.01 |
| 4 | " | " | 1.58 | Light Gray | — | — | 0.02 |
| 5 | " | 700° | 1.37 | Light Gray | — | — | — |
| 5 | " | 750° | 1.50 | Light Gray | — | — | <0.01 |
| 6 | 100 | 700° | 1.49 | Gray | — | — | 0.03 |
| 6 | 100 | " | 1.51 | Gray | <0.01 | 0.02 | — |
| 6 | 325 | " | 1.50 | Gray | — | — | 0.05 |
| 7 | 200 | 725° | 1.65 | Light Gray | — | — | 0.00 |
| 8 | " | 700° | 1.59 | Gray | — | — | <0.01 |
| 9 | " | " | 1.50 | Gray | — | — | 0.00 |

TABLE II-continued

| Example No. | Mesh Size | Firing Temp. | Button Diameter | Button Appearance | % Weight Loss NaOH 16 hours | % Weight Loss NaOH 92 hours | % Weight Loss Super Soilax |
|---|---|---|---|---|---|---|---|
| 9 | " | 725° | 1.67 | Light Gray | — | — | 0.00 |
| 9 | " | 750° | 1.94 | Light Gray | — | — | <0.01 |
| 10 | 100 | 700° | 1.61 | Light Gray Brown | — | — | 0.02 |
| 10 | " | " | 1.56 | Light Gray Brown | <0.01 | 0.03 | — |
| 10 | 200 | 700° | 1.57 | Light Gray | — | — | — |
| 11 | " | " | 1.55 | Gray | — | — | <0.01 |
| 11 | " | 725° | 1.80 | Gray | — | — | <0.01 |
| 12 | " | " | 1.56 | Light Brown Gray | — | — | 0.00 |
| 13 | " | " | 1.57 | Gray | — | — | <0.01 |
| 14 | 100 | 700° | 1.58 | Light Gray Brown | — | — | 0.02 |
| 14 | " | " | 1.51 | Light Gray Brown | <0.01 | 0.02 | — |
| 15 | 200 | 675° | 1.49 | Light Gray | — | — | 0.00 |
| 15 | " | 700° | 1.71 | Off White | — | — | 0.00 |
| 15 | " | 725° | 1.84 | Off White | — | — | 0.00 |
| 16 | " | 700° | 1.64 | Gray | — | — | 0.00 |
| 17 | " | " | 1.70 | Gray | — | — | 0.00 |
| 18 | " | " | 1.74 | Light Brown | — | — | 0.00 |
| 19 | " | " | 1.75 | Light Brown | — | — | <0.01 |
| 20 | " | 675° | 1.62 | Gray Brown | — | — | <0.01 |
| 20 | " | 700° | 1.86 | Light Gray | — | — | 0.00 |
| 20 | 200 | 725° | 2.10 | Light Gray | — | — | 0.00 |
| 21 | " | 700° | 1.32 | Light Gray | — | <0.01 | |
| 21 | " | 725° | 1.50 | Gray Brown | — | — | |
| 21 | " | 750° | 1.79 | Light Cream | — | — | <0.01 |
| 22 | " | 700° | 2.07 | Light Gray | — | — | 0.03 |
| 23 | " | " | 1.55 | Gray Brown | — | — | 0.00 |
| 23 | " | 725° | 1.68 | Light Brown | — | — | 0.00 |
| 24 | " | 700° | 1.83 | Light Brown | — | — | <0.01 |
| 25 | " | 650° | 1.32 | Gray | — | — | <0.01 |
| 25 | " | 675° | 1.54 | Dark Gray | — | — | 0.00 |
| 26 | " | 700° | 1.50 | Light Brown | — | — | 0.03 |
| 26 | " | 725° | 1.64 | Gray Brown | — | — | 0.03 |
| 26 | " | 750° | 1.98 | Gray Brown | — | — | <0.01 |
| 27 | " | 700° | 1.42 | Gray | — | — | 0.00 |
| 27 | " | 725° | 1.60 | Gray-Green | — | — | <0.01 |
| 27 | " | 750° | 1.92 | Gray-Green | — | — | <0.01 |
| 28 | 200 | 650° | 1.62 | Gray | — | — | 0.05 |
| 28 | " | 675° | 2.04 | Light Gray | — | — | 0.03 |
| 29 | " | 700° | 1.45 | Gray | — | — | <0.01 |
| 30 | " | " | 1.49 | Off White | — | — | 0.012 |
| 31 | " | " | 1.58 | Gray | — | — | 0.00 |
| 32 | " | " | 1.64 | Light Gray | — | — | 0.00 |
| 33 | " | " | 1.42 | Light Blue-Gray | — | — | <0.01 |
| 34 | 100 | " | 1.45 | Gray | 0.01 | 0.06 | — |
| 35 | 100 | " | 1.51 | Gray | 0.01 | 0.02 | — |

As can be seen through an inspection of Table II, the mesh size of the frit particles, viz, 100, 200, or 325 mesh, had little effect upon the melting behavior or the physical properties displayed by the frits. Also, each of the frits evidenced excellent resistance to attack by alkalies. Each sample demonstrated highly glossy surfaces after the test. Weight loss is considered to be a much more sensitive indicator of chemical attack than either a visual appraisal of a loss of gloss or the penetrant test for porosity. For example, test samples exhibiting weight loss of as high as 1–2% have been observed which displayed glossy, non-porous surfaces.

To determine the extent of the volatilization of such fugitive components as $B_2O_3$ and F during melting of the batch, chemical analyses of these constituents were undertaken with three of the reported examples. Those results in weight percent are reported in Table III.

TABLE III

| | 1 | 9 | 27 |
|---|---|---|---|
| $B_2O_3$ | 30.6 | 19.9 | 7.34 |
| F | 0.59 | 1.26 | 0.96 |

A comparison of those analyzed values with the batch levels set forth in Table I illustrates that the loss of $B_2O_3$ is no more than about 1% and that of F is less than about 25%. Such losses can be held to even lower percentages in commercial melting processes.

In order to investigate the behavior of the inventive frits utilizing a firing mode approximating that of a commercial decoration schedule, a group of the frits was subjected to the following treatment which closely parallels the practice employed in applying enamels to CORELLE® ware, a dinnerware product marketed by Corning Glass Works. The frits, after being ground to pass a No. 200 U.S. Standard Sieve, were pressed into cylinders in like manner to those described above and those cylinders introduced into a furnace operating at 765° C. After the temperature within the furnace had been re-established (~four minutes), the frits were maintained for five minutes at 765° C. and then removed from the furnace to cool in air.

Table IV reports the diameter of the flow buttons (cm), the weight loss measured after 96 hours' exposure to the above-described Super Soilax test, and the weight loss determined after immersion in an aqueous solution containing 4% by weight acetic acid for 24 hours at room temperature. The latter test is taken from the above-mentioned *Compliance Guidance Manual*, issued June 13, 1974, by the Food and Drug Administration (FDA), wherein maximum limits of lead and/or cadmium release from enameled surfaces were prescribed.

The test comprises exposing an enameled surface for 24 hours to a 4% acetic acid solution at room temperature (22±2° C.).

TABLE IV

| Example No. | Flow Button Diameter | % Loss Super Soilax | % Loss Acetic Acid |
|---|---|---|---|
| 7 | 1.42 | 0.0 | 0.0 |
| 8 | 1.53 | <0.01 | 0.0 |
| 9 | 1.39 | 0.0 | 0.0 |
| 30 | 1.39 | 0.0 | 0.0 |
| 32 | 1.46 | 0.0 | 0.0 |
| 33 | 1.40 | 0.0 | 0.0 |

As can be seen from the tabulated data, the frits demonstrated satisfactory flow characteristics and were essentially unaffected by the detergent and acid immersions. X-ray diffraction examination indicated the absence of crystallization in the fused buttons.

Finally, frits of Examples 8 and 9 were ground to pass a No. 325 U.S. Standard Sieve, blended with 10 weight percent each of commercially-marketed blue and red ceramic pigments, and silk screened onto dinner plates of CORELLE ® ware. CORELLE ® ware is a laminated product consisting of a thin skin and a thick core of body portion. The skin has a coefficient of thermal expansion (0°–300° C.) of about $48 \times 10^{-7}/°C$. whereas the core portion has a coefficient of thermal expansion (0°–300° C.) of about $72 \times 10^{-7}/°C$. Because of the comparatively large bulk of the core portion, a decorative glaze or enamel should have a coefficient of thermal expansion compatible with it. As can be observed in Table I, Examples 8 and 9 exhibit coefficients of thermal expansion of 68.3 and 70.0, respectively. The silk-screened enamel was fired for 10 minutes at 725° C. producing glossy red and blue decorations free from pinholes, crazing, and spalling. The decorated ware evidenced no sign of attack upon exposure to Super Soilax.

In addition to commercially-available pigments, varying amounts of hematite (alpha $Fe_2O_3$) have been incorporated into the inventive frits to yield glossy colored decorations ranging from orange-red to brownish-red.

I claim:

1. A frit exhibiting good glass stability, high gloss, a coefficient of thermal expansion (20°–300° C.) between about $50$–$110 \times 10^{-7}/°C$., a viscosity suitable for firing at 650°–775° C., and excellent resistance to attack by acids and bases consisting essentially, expressed in weight percent on the oxide basis as calculated from the batch, of:

$SiO_2$: 29–55
$B_2O_3$: 7–31
$Al_2O_3$: 2–8
$ZrO_2$: 5–16
$Na_2O$: 4–20
$Li_2O$: 0–7
$Na_2O + Li_2O$: 6–24
F: 0.75–4

2. A frit according to claim 1 exhibiting a coefficient of thermal expansion (20°–300° C.) between $50$–$80 \times 10^{-7}/°C$. and a viscosity suitable for firing at 675°–775° C. consisting essentially, expressed in weight percent on the oxide basis as calculated from the batch, of:

$SiO_2$: 40–55
$B_2O_3$: 16–31
$Al_2O_3$: 5–8
$ZrO_2$: 5–14
$Na_2O$: 4–10
$Li_2O$: 0–7
$Na_2O + Li_2O$: 6–13
F: 0.75–4

* * * * *

UNITED STATES PATENT AND TRADEMARK OFFICE
CERTIFICATE OF CORRECTION

PATENT NO. : 4,224,074
DATED : September 23, 1980
INVENTOR(S) : Richard F. Reade It is certified that error appears in the above—identified patent and that said Letters Patent are hereby corrected as shown below:

Patent

Column 6, line 48, "strain" should be -- stain --.

Table II, Example No. 21, Mesh Size 200, Firing Temp. 700°, Button Diameter 1.32, Button Appearance Light Gray, 16 hours ---, 92 hours, "<0.01" should be -- --- --.

Table II, Example No. 21, Mesh Size 200, Firing Temp. 700°, Button Diameter 1.32, Button Appearance Light Gray, 16 hours ---, % Weight Loss Super Soilax, "---" should be -- <0.01 --.

Column 9, line 26, "of", first occurrence, should be -- or --.

Signed and Sealed this

Twenty-seventh Day of January 1981

[SEAL]

Attest:

RENE D. TEGTMEYER

Attesting Officer   Acting Commissioner of Patents and Trademarks